United States Patent
Petersen et al.

(10) Patent No.: US 10,288,366 B2
(45) Date of Patent: May 14, 2019

(54) LIQUID DISTRIBUTOR AND ARRANGEMENT

(71) Applicant: TECHNISCHE UNIVERSITÄT BERLIN, Berlin (DE)

(72) Inventors: Stefan Petersen, Berlin (DE); Wolfgang Lanser, Berlin (DE); Christian Hennrich, Berlin (DE); Reinken Henning, Berlin (DE)

(73) Assignee: TECHNISCHE UNIVERSITAT, Berlin (DE)

( * ) Notice: Subject to any disclaimer, the term of this patent is extended or adjusted under 35 U.S.C. 154(b) by 55 days.

(21) Appl. No.: 15/302,823

(22) PCT Filed: Apr. 2, 2015

(86) PCT No.: PCT/DE2015/100144
§ 371 (c)(1),
(2) Date: Oct. 7, 2016

(87) PCT Pub. No.: WO2015/154753
PCT Pub. Date: Oct. 15, 2015

(65) Prior Publication Data
US 2017/0030663 A1    Feb. 2, 2017

(30) Foreign Application Priority Data
Apr. 8, 2014 (DE) .................. 10 2014 105 008

(51) Int. Cl.
*F28F 25/04* (2006.01)
*B01D 3/00* (2006.01)
(Continued)

(52) U.S. Cl.
CPC .............. *F28F 25/04* (2013.01); *B01D 3/008* (2013.01); *F28B 9/04* (2013.01); *F28D 3/04* (2013.01)

(58) Field of Classification Search
CPC .. B01D 3/008; F28D 3/04; F28F 25/04; F28B 9/04
See application file for complete search history.

(56) References Cited

U.S. PATENT DOCUMENTS 2,732,190 A * 1/1956 Mart ..................... F28C 1/04
261/110
3,290,025 A * 12/1966 Engalitcheff, Jr. .... B01D 3/008
239/193
(Continued)

FOREIGN PATENT DOCUMENTS

DE        1151491 B    7/1963
DE         266699 A3   4/1989
(Continued)

OTHER PUBLICATIONS

EPO translation of Manteufel WO 01/28648 A1 published Apr. 26, 2001 (Year: 2001).*
(Continued)

*Primary Examiner* — Stephen Hobson
(74) *Attorney, Agent, or Firm* — Harness Dickey

(57) ABSTRACT

The application relates to a liquid distributor (1) for supplying a liquid in a pressure-free manner over a surface area, having a distributor trough (2) with a trough base (3) which, for the purpose of discharging liquid, has an arrangement of holes (5), which extends over at least part of the surface of the trough base (3), having an inflow (4), via which a liquid which is to be distributed can be introduced in the distributor trough (2) such that the liquid introduced accumulates on the trough base (3), and having a retaining device with a retaining plate (7), which is arranged opposite the trough base (3) and at a distance apart therefrom, wherein distributing elements (6), which project from the retaining plate (7) in the direction of the trough base (3), each engage through an associated hole of the arrangement of holes (5) in the
(Continued)

Figure 1:
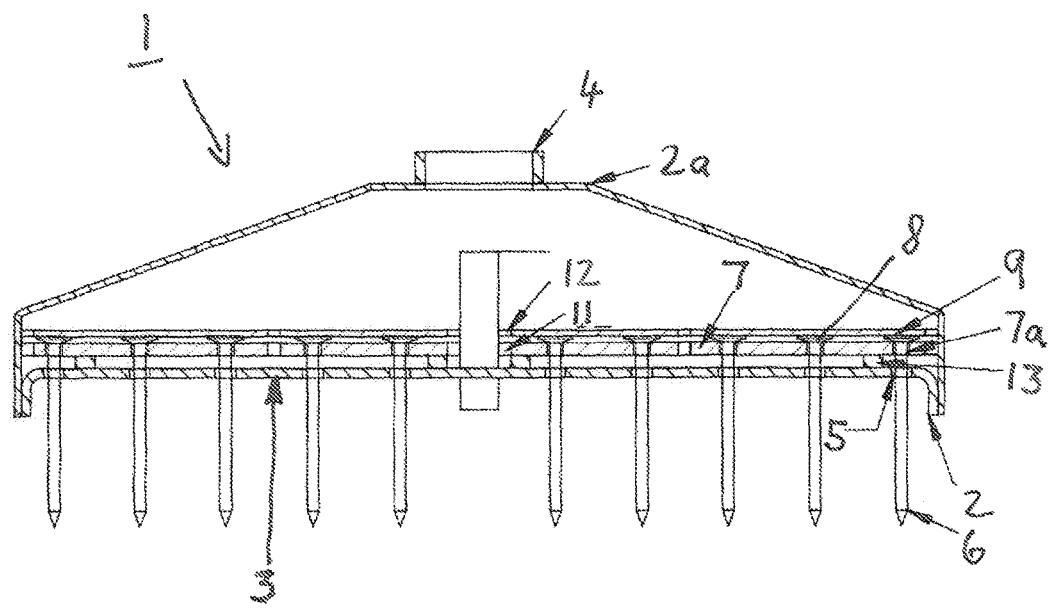

trough base (3) and are accommodated loosely therein such that the liquid accumulating on the trough base (3) can be discharged through free hole regions (10), which are not affected by the distributing elements (6) extending through the holes (5).

14 Claims, 2 Drawing Sheets

(51) Int. Cl.
*F28B 9/04* (2006.01)
*F28D 3/04* (2006.01)

(56) References Cited

U.S. PATENT DOCUMENTS

| | | | | |
|---|---|---|---|---|
| 3,446,489 A * | 5/1969 | Leva | ...................... | B01D 3/008 261/113 |
| 4,267,978 A * | 5/1981 | Manteufel | .............. | B01D 3/008 137/561 A |
| 4,432,913 A * | 2/1984 | Harper | ..................... | B01D 3/20 239/193 |
| 4,476,069 A * | 10/1984 | Harper | ..................... | B01D 3/20 239/193 |
| 4,909,967 A * | 3/1990 | Binkley | ................. | B01D 3/008 239/600 |
| 5,013,491 A * | 5/1991 | Nutter | .................. | B01D 53/185 261/97 |
| 5,192,465 A * | 3/1993 | Petrich | ................... | B01D 3/008 261/97 |
| 5,783,119 A * | 7/1998 | Ulrich | .................... | B01D 3/008 261/110 |
| 6,173,905 B1 * | 1/2001 | Schultes | ................ | B01D 3/008 239/194 |
| 9,259,665 B2 * | 2/2016 | Norton | ................... | B01D 3/008 |
| 2017/0266583 A1 * | 9/2017 | Crayssac | ................ | B01D 3/008 |

FOREIGN PATENT DOCUMENTS

| | | |
|---|---|---|
| DE | 102004012276 A1 | 9/2005 |
| DE | 102005028902 A1 | 3/2006 |
| JP | 2004125317 A | 4/2004 |
| WO | WO 01/28648 A1 * | 4/2001 |
| WO | WO-2005088226 A2 | 9/2005 |

OTHER PUBLICATIONS

International Search Report (in English and German) and Written Opinion of the International Searching Authority (in German) for PCT/DE2015/100144, dated Jul. 7, 2015; ISA/EP.

* cited by examiner

LIQUID DISTRIBUTOR AND ARRANGEMENT

CROSS REFERENCE TO RELATED APPLICATIONS

This application is a U.S. National Phase Application under 35 U.S.C. 371 of International Application No. PCT/DE2015/100144 filed on Apr. 2, 2015 and published in German as WO 2015/154753 on Oct. 15, 2015. This application is based on and claims the benefit of priority from German Patent Application No. 10 2014 105 008.8 filed Apr. 8, 2014. The entire disclosures of all of the above applications are incorporated herein by reference.

The invention relates to a liquid distributor for discharging a liquid in a pressure-free planar as well as an arrangement.

BACKGROUND

Liquid distributors of this kind are used for example in refrigeration plants. Refrigeration plants have achieved enormous growth rates in the market over the past years. Longer cooling chains in the food industry, higher process performances and more comfortable living and working conditions require new efficient refrigeration plants. Here electrically driven compression plants, which can be supplemented by thermally driven absorption and adsorption processes, are dominant. The latter, in particular against the background of increased efficiency of energy usage also for enhancing CHP plants (CHP—power-heat coupling), represent a resource-saving solution for not additionally increasing the power demand during cold utilisation and instead for using the waste heat resulting from power production directly for refrigeration.

Supply systems with a liquid distributor can be divided into essentially two classes. A difference is made between spraying systems and drip-off systems. Spraying systems as a rule require pre-pressure in the inflow of the spraying device which, dependent on the nozzle shape, is a multiple of the pressure required by drip-off pressure-free systems. For these systems a small hydrostatic height above a drip-off device is sufficient. Pressure-free systems, due to their characteristic of utilising gravity, can supply only from above, whereas pressure-based systems can also spray from the bottom to the top or to the side. A liquid distributor of the pressure-free type is known from document DE 10 2004 012 276 A1.

Generally speaking pressure-free systems have the advantage that no energy has to be spent on pressurising the fluid, and that the flown-through cross-sections of most pressure-free systems are a multiple of the nozzle diameters of pressurised spraying systems, so that the systems react to and function less sensitively in the face of solid fractions in the fluid. However, previously known pressure-free drip-off systems are faced with having to fight contamination. With the known liquid distributor in document DE 10 2004 012 276 A1, the inflow into a channel, at the lower end of which the drip-off point is arranged, is positioned significantly above the trough in which the fluid resides (flows), so that solids gather at the bottom of the trough.

In document DD 266 699 A3 a liquid distributor has been disclosed, in which at least two horizontally parallel perforated plates are arranged one above the other at a distance ensuring the capillary effect, wherein capillary fluid ducts protrude through the perforations of the lower plate in a downward direction. The liquid is discharged in that, due to the capillary effect, it travels through holes in the upper plate into an intermediate space between the upper and the lower plate. In the intermediate space the liquid again distributes based on the capillary effect in order, again making use of this effect, to be discharged through holes in the lower plate, wherein capillary fluid ducts are pushed into the holes of the lower plate. Liquid transport from the topside of the upper plate to the underside of the lower plate through the plate arrangement is effected always utilising the capillary effect. The problem here is that the capillary spaces get shifted in operation so that functionality of the liquid distributor is negatively affected.

Document DE 10 2005 028 902 A1 has disclosed a heat exchanger and a method for manufacturing the same, wherein the heat exchanger comprises an intermediate layer for cooling a heat source. The intermediate layer is coupled to a heat source and designed to guide a fluid through it. The heat exchanger further comprises a distributor layer, which is coupled to the intermediate layer. The distributor layer comprises at least one first connection coupled to a first group of individual holes, which channel fluid through the first group. The distributor layer comprises at least one second connection coupled to a second group of individual holes, which channel fluid through the second group. The first group of holes and the second group of holes are arranged to provide a minimised fluid path length between the first and the second connection in order to provide adequate cooling to the heat source. Preferably each hole in the first group is arranged at a closest optimal distance to an adjacent hole of the second group.

Document DE 11 51 491 A has disclosed a device for evenly distributing a fluid and vapour mixture across a contact bed of solid body particles. The mixture flows through the reactor from the top to the bottom. A distributor base provided with openings is provided in the upper part of the reactor. Furthermore open-top permeable baskets are formed, which are arranged in the upper boundary layer of the solid body bed.

SUMMARY

It is the object of the invention to propose a liquid distributor for supplying a liquid in a pressure-free planar manner as well as to indicate an arrangement, with which a liquid to be discharged can be distributed over a desired surface efficiently and also reliably for maximum variations in viscosity, surface tension and/or quantity.

According to independent claim 1 this objective is met by a liquid distributor for supplying a liquid in a pressure-free manner over a surface area. Furthermore an arrangement with a liquid distributor according to claim 14 is proposed. Developments are the subject of dependent claims.

According to one aspect a liquid distributor for supplying a liquid in a pressure-free planar manner is proposed, which comprises a distributor trough with a trough base. In the trough base an arrangement of holes or breakthroughs for discharging the liquid is formed, which extend across at least part of the surface of the trough base. The part of the surface may be formed continuously or may consist of a number of sub-parts separated from each other. In one design the arrangement of holes essentially extends over the entire trough base. The liquid distributor comprises an inflow via which a liquid to be distributed can be introduced into the distributor trough such that the introduced liquid accumulates on the trough base. To this end the inflow and/or liquid discharge can be adjusted. An accumulation height can be different depending on the application and it can be optionally controlled, for example by regulating the inflow. Furthermore a retaining device with a retaining plate is provided, which is arranged opposite the trough base and at a distance apart therefrom. The trough base and the retaining plate may be arranged plane-parallel. Alternatively an inclined position of the retaining plate relative to the trough base may be provided. Distributing elements projecting from the retaining plate extend in direction of the trough base, each of which engages through an associated hole of the arrangement of holes in the trough base and is accommodated loosely therein such that the liquid accumulating on the trough base can be discharged through the free hole regions. The free hole regions or hole cross-sectional regions are not affected by the distributing elements extending through the holes.

According to a further aspect an arrangement with such a liquid distributor and a material exchanging surface or heat exchanging surface is provided, onto which a liquid to be distributed can be areally discharged by means of the liquid distributor. The heat exchanging surface may be formed, for example, on a heat exchanger, in particular a shell-and-tube heat exchanger, wherein a fluid film flows over a tube outer side, for the configuration of which the liquid distributor may be utilised. The liquid distributor can be used in an absorption or an adsorption refrigeration system. The main components of sorption refrigeration systems are heat exchanger, evaporator, absorber, desorber and capacitor, of which the first three may be irrigated shell-and-tube heat exchangers.

Alternatively or additionally the arrangement with liquid distributor and material exchanging surface or heat exchanging surface can be used in a heat transformer, a heat pump or another thermo-technical system, in which a liquid is to be distributed in a pressure-free manner and as evenly as possible.

The distributor trough may comprise one or more overflows for liquid which is not discharged through the holes in the trough base.

The distance between the retaining plate and the trough base can be realised so as to support a free flow of the liquid or the capillary effect. Also a combination of spacer areas can be provided, which permit flowing of the liquid free from the capillary effect as well as a transport utilising the capillary effect.

In the free hole areas, through which the liquid can be discharged, the hole wall and the outer surface of the distributing elements may be spaced apart, securing the capillary effect. The free hole areas may comprise hole cross-sectional areas, in which the capillary effect is not ensured or even excluded. Different free hole areas, in which the capillary effect contributes to the liquid transport or not, may occur inside a hole. Also holes may be provided in which the capillary effect ensures the liquid transport in the free hole areas, as well as holes in which the capillary effect is reduced or does not occur at all.

The distributing elements may be designed differently as regards shape, length and/or diameter. The holes may be configured differently as regards shape and/or diameter. The free hole areas, which are defined by the holes and the distributing elements, may be configured differently as regards shape and/or hydraulically effective diameter.

With one development provision may be made for the distributing element in a distributing element section engaging through the hole on the one hand, and for the associated hole on the other, to comprise different cross-sectional shapes. The holes in the trough base and/or the distributing element in the distributing element section engaging through the hole, may comprise a cross-sectional shape selected from the following group: angular, in particular rectangular or triangular, round and oval. Or the cross-sectional shapes of the distributing element and the hole may be equal. Feasible is also a combination of holes, into which distributing elements with identical cross-sectional shape engage, and holes into which distributing elements with a cross-sectional shape different from the hole cross-sectional shape engage.

The distributing elements may be detachably arranged on the retaining plate. With an alternative embodiment the distributing elements are not detachably arranged on, but for example welded to, the retaining plate. Or provision may be made for a combination of detachable and non-detachable distributing elements on the retaining plate. In connection with the detachable attachment of the distributing elements on the retaining plate provision may be made for the distributing elements to be displaceable relative to the retaining plate, for example displaceable into an inclined position relative to the plate plane.

A further development may provide for the distributing elements on the retaining plate to be arranged in an associated opening, respectively. In connection with this arrangement in an associated opening, a detachable or non-detachable arrangement may be provided.

The distributing elements on the retaining plate may each be pushed through the associated opening such that a distributing element head is arranged on the rear-side, optionally in an associated indentation on the retaining plate. Such an embodiment can for example be produced with the aid of distributing elements which have a nail shape.

A further development may provide for a cover plate to be arranged opposite the rear-side of the retaining plate, which rests on the distributing element head sections of the pushed-through distributing elements. The cover plate may rest on the rear-side surface of the retaining plate, at least in sections. The cover plate may, at least partially, take over the function of securing the distributing elements on the retaining plate in an operating position. Provision may be made for the cover plate to be arranged so as to allow a displacement of the distributing elements in the associated hole, for example in connection with an inclined position of the distributing elements relative to the plate plane. The cover plate may be connected to the retaining plate in a detachable or non-detachable manner.

The retaining plate may be arranged spaced apart from the trough base by means of one or more spacers. The spacer or spacers may be exchangeable or replaceable, for example for the purpose of altering the distance between retaining plate and trough base. The retaining plate may be arranged on the spacers in a detachable or non-detachable manner.

The retaining plate together with the distributing elements arranged thereon may be arranged so as to be displaceable relative to the trough base with the arrangement of holes. Such a displacement may, for example, provide for a shift of the retaining plate in a plane which is plane-parallel to the trough base, which results in the distributing elements assuming an inclined position. Alternatively or in addition thereto a displacements may consist in altering the distance between trough base and retaining plate, wherein here the distributing elements do not need to alter their relative position to the retaining plate (upright position). This or other relative shifts between retaining plate and trough base may be utilised in connection with a maintenance process for loosening and removing impurities, which obstruct the flow paths in the liquid distributor of the liquid, which is to be discharged. In this context provision may also be made for a shaking of the retaining plate.

With one embodiment provision may be made for the retaining plate to be displaceable based on the liquid flowing into the trough and/or based on the liquid accumulating in the trough. With this embodiment the retaining plate shifts in relation to the trough base, based for example on the flowing-in of the liquid, for example the retaining plate may be lifted. Alternatively or additionally provision may be made for the retaining plate to move when the liquid accumulates on the trough base, for example by means of lifting, as this may also be the case during flowing-in of the liquid.

The retaining plate may be arranged in the distributor trough. The retaining plate here is arranged in the volume of the distributor trough. Alternatively provision may be made for the retaining plate to be retained above the trough, wherein then the distributing elements would protrude into the trough and extend through the trough base.

With one development provision may be made for the distributing elements, in the area of a section projecting from the retaining plate, which engages through the associated hole in the trough base, to be realised as a pin or mandrel. With this or other embodiments the distributing elements, at least insofar as they extend from the retaining plate, may have a cylindrical shape.

The retaining plate may comprise at least one outlet opening, through which the introduced liquid can reach the trough base. Similarly to the outlet opening in the retaining plate the cover plate may comprise an opening, through which the introduced liquid reaches the trough base. The outlet openings in the retaining plate and in the cover plate may be configured so as to be at least partially areally overlapping. The liquid transport towards the trough base can take place in the one or more outlet openings due to the capillary effect and/or independently therefrom.

DESCRIPTION OF EXEMPLARY EMBODIMENTS

Figure 2:
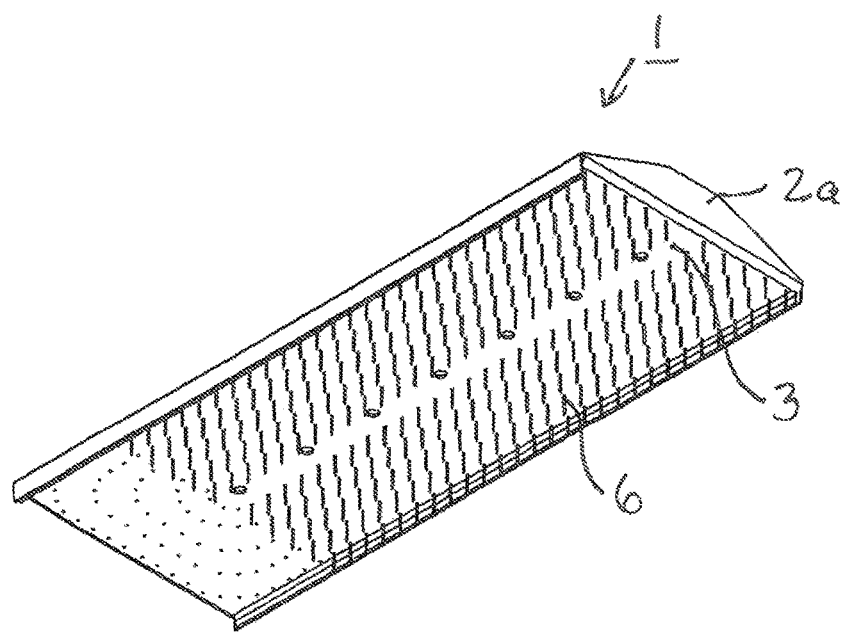
Figure 3:
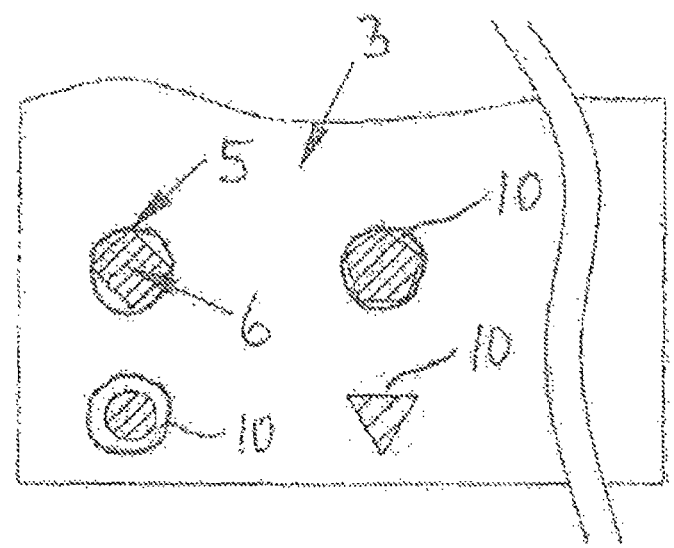
Figure 3:
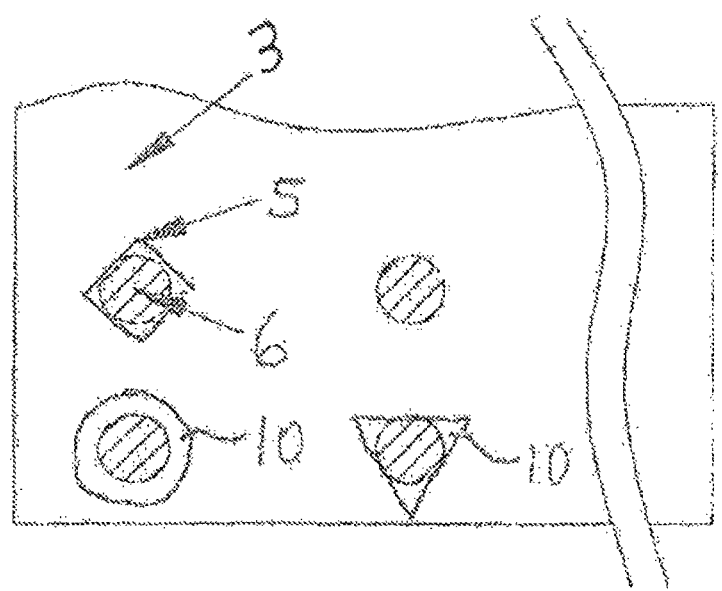

Exemplary embodiments will now be explained in detail with reference to figures of a drawing, in which FIG. 1 shows a schematic view of a liquid distributor in cross-section, FIG. 2 shows a perspective view of a liquid distributor from obliquely below and FIG. 3 shows schematic views of sections of a trough base of the liquid distributor, where holes of distributing elements of various cross-sectional shapes are being engaged through.

FIG. 1 shows a schematic view of a liquid distributor 1 in cross-section. A distributor trough 2 with a trough base 3 is formed. The distributor trough in the form shown is closed at the top by means of a cover 2a. A liquid to be distributed in the distributor trough 2 can be introduced via an inflow 4. An arrangement of holes 5 is provided in the trough base 3. The holes of the arrangement 5 are being engaged each by a distributing element 6, which extends from a retaining plate 7 in direction of the trough base 3 and then engages through the holes of arrangement 5.

With the embodiment shown a distributing element head section 8 rests on top of the retaining plate 7. The distributing elements 6 engage through breakthroughs 7a in the retaining plate 7. A cover plate 9 is arranged opposite the distributing element head section 8, which cover plate contributes to securing the distributing elements 6 on the retaining plate 7.

The distributing elements 6 are loosely received in the holes 5 of the arrangement such that in the cross-sectional area of holes 5 of the arrangement, free hole areas 10 (see FIG. 3 below) are formed, through which the introduced liquid can be discharged.

The retaining plate 7 as well as the cover plate 9 have outlet openings 11, 12 formed in them, for allowing the introduced liquid to pass through to the trough base 3, so that the liquid to be discharged accumulates above the trough base 7. The distance between the trough base 3 and the retaining plate 7 in the embodiment shown is determined with the aid of spacers 13.

FIG. 2 shows a perspective view of the liquid distributor 1 obliquely from below.

FIG. 3 shows schematic views of sections of the trough base 3 with holes 5, through each of which a distributing element 6 engages. It is shown that both the cross-section of the holes 5 and the cross-section of the distributing elements 6 in the area of the engaged holes can be different. The important point is that free hole areas 10 are formed, through which the liquid to be supplied can pass through the trough base 3, be it with or without the influence of the capillary effect.

The liquid can be supplied continually or regularly by means of the liquid distributor. In order to ensure an even distribution of the liquid, a multitude of drip-off points is provided. The drip-off amount, which among others is a function of the free cross-section between the trough base hole and the distributing element 6 engaging through, may be different from one drip-off point to another based on a combination of different embodiments within an arrangement.

In one embodiment all distributing elements 6 and holes are identical. Expedient variations, even within an arrangement, may be: shape/diameter of the distributing element 6; shape, diameter of the hole; distance trough base 3 relative to retaining plate 7; and thickness of the trough base 3.

There exists a non-rigid, loose connection between the retaining plate 7 (including cover plate) and the trough base 3 so that the retaining plate 7 can be easily shifted in relation to the floor plate. Due to this movability cleaning may be effected of the free cross-sections between the distributing elements 6 and the trough base 3, which is dictated by the design of the holes and the distributing elements 6.

A further advantageous embodiment could consist in that the liquid supply is designed such that the retaining plate 7 moves in dependence of the liquid supply. For example the retaining plate 7 could rest like a lid on the liquid supply so that it must lift in order to allow the liquid to enter. This movement would encourage the cleaning effect of the open cross-sections on the holes to the drip-off points.

One embodiment could provide for the distributing elements 6 to comprise different diameters and/or different shapes, so that the amounts of liquid exiting locally at each distributing element 6 are different. This can be a means, in the case of small amounts of liquid to be distributed, for wetting the heat exchanger unit below more evenly across the entire surface, independently of the distance to the liquid inflow.

The features disclosed in the above description, the claims and the drawing can be of importance for the realisation of different embodiments, both individually and in any combination.

The invention claimed is:

1. A liquid distributor for supplying a liquid in a pressure-free, planar manner, having a distributor trough with a trough base, which for the purpose of discharging the liquid, has an arrangement of holes, which extends over at least part of the surface of the trough base, an inflow, via which the liquid which is to be distributed can be introduced in the distributor trough such that the liquid introduced accumulates on the trough base, and a retaining device with a retaining plate, which is arranged opposite the trough base and at a distance apart therefrom, wherein distributing elements, which project from the retaining plate in the direction of the trough base, each engage through an associated hole of the arrangement of holes in the trough base and are accommodated loosely therein such that the liquid accumulating on the trough base can be discharged through free hole regions, which are not affected by the distributing elements extending through the holes.

2. The liquid distribution according to claim 1, wherein in the free hole areas, through which the liquid can be discharged, the hole wall and the outer surface of the distributing elements are spaced apart so as to ensure the capillary effect.

3. The liquid distributor according to claim 1, wherein the distributing element, in a distributing element section engaging through the hole and associated hole have different cross-sectional shapes.

4. The liquid distributor according to claim 1, wherein the distributing elements are detachably attached to the retaining plate.

5. The liquid distributor according to claim 1, wherein the distributing elements are arranged on the retaining plate, each in an associated opening.

6. The liquid distributor according to claim 5, wherein the distributing elements on the retaining plate are each pushed through the associated opening such that a distributing element head is arranged on the rear-side.

7. The liquid distributor according to claim 6, wherein the rear-side of the retaining plate is arranged opposite a cover plate, which rests on the distributing element head sections of the pushed through distributing elements.

8. The liquid distributor according to claim 1, wherein the retaining plate is arranged so as to be spaced apart from the trough base by means of one or more spacers.

9. The liquid distributor according claim 1, wherein the retaining plate together with the distributing elements arranged thereon is arranged so as to be displaceable relative to the trough base with the arrangement of holes.

10. The liquid distributor according to claim 9, wherein the retaining plate is displaceable based on the liquid entering the distributor trough and/or the liquid accumulating in the distributor trough.

11. The liquid distributor according to claim 1, wherein the retaining plate is arranged in the distributor trough.

12. The liquid distributor according to claim 1, wherein the distributing elements, in the area of a section projecting from the retaining plate which section engages through the associated hole in the trough base is realised as a pin or mandrel.

13. The liquid distributor according to claim 1, wherein the retaining plate comprises at least one outlet opening, through which the liquid can reach the trough base.

14. An arrangement with a liquid distributor according to claim 1 and with a material exchanging surface or heat exchanging surface, onto which a liquid to be distributed can be areally discharged by means of the liquid distributor.

* * * * *